(12) United States Patent  
Mendelsohn

(10) Patent No.: US 11,863,289 B2  
(45) Date of Patent: Jan. 2, 2024

(54) SATELLITE COMMUNICATIONS SYSTEM WITH NON-GEOSYNCHRONOUS ORBITS

(71) Applicant: ViaSat, Inc., Carlsbad, CA (US)

(72) Inventor: Aaron Mendelsohn, Carlsbad, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 17/907,080

(22) PCT Filed: Mar. 3, 2021

(86) PCT No.: PCT/US2021/020763  
§ 371 (c)(1),  
(2) Date: Sep. 22, 2022

(87) PCT Pub. No.: WO2021/202045  
PCT Pub. Date: Oct. 7, 2021

(65) Prior Publication Data  
US 2023/0133837 A1 May 4, 2023

Related U.S. Application Data

(60) Provisional application No. 63/004,955, filed on Apr. 3, 2020.

(51) Int. Cl.  
*H04B 7/185* (2006.01)  
*B64G 1/10* (2006.01)  
(Continued)

(52) U.S. Cl.  
CPC ......... *H04B 7/1851* (2013.01); *B64G 1/1007* (2013.01); *B64G 1/242* (2013.01); *H04B 7/195* (2013.01)

(58) Field of Classification Search  
CPC .. H04B 7/1851; H04B 7/18513; H04B 7/185; H04B 7/195; B64G 1/1007; B64G 1/242; B64G 1/1021  
See application file for complete search history.

(56) References Cited

U.S. PATENT DOCUMENTS 5,845,206 A 12/1998 Castiel et al.  
6,122,596 A 9/2000 Castiel  
(Continued)

FOREIGN PATENT DOCUMENTS

| CA | 2716174 A1 * | 4/2012 | ........... B64G 1/1085 |
| EP | 1047211 A2 | 10/2000 | |
| WO | 0239616 A2 | 5/2002 | |

OTHER PUBLICATIONS

"Section 2. Satellite Orbits", University of Toronto; Phy 499S; Earth Observations from Space, Spring Term (K. Strong), 2005, 1-22.

*Primary Examiner* — Keith Ferguson  
(74) *Attorney, Agent, or Firm* — HOLZER PATEL DRENNAN

(57) ABSTRACT

A satellite communication system in which a plurality of satellites each transit about the Earth in a common mid-Earth orbit. The orbit may be configured such that each satellite of the plurality of satellites follows a common, repeating ground track relative to the surface of the Earth. In turn, one or more repeating sky tracks may be defined relative to at least one ground station such that the ground station is in continuous communication with at least one of the plurality of satellites. In an example, a ground station may have visibility to a plurality of repeating sky tracks such that a plurality of discreet communication channels is provided that use different satellites for communication with user terminals of the satellite communications system.

14 Claims, 13 Drawing Sheets

(51) Int. Cl.
*B64G 1/24* (2006.01)
*H04B 7/195* (2006.01)

(56) References Cited

U.S. PATENT DOCUMENTS

| | | |
|---|---|---|
| 6,182,927 B1 | 2/2001 | Galvin |
| 6,263,188 B1 | 7/2001 | Castiel et al. |
| 6,678,519 B2 | 1/2004 | Castiel et al. |
| 6,695,260 B2 | 2/2004 | Castiel et al. |
| 6,714,521 B2 | 3/2004 | Draim |
| 6,851,651 B2 | 2/2005 | Goodzeit |
| 7,184,761 B1 | 2/2007 | Wang |
| 7,369,809 B1 | 5/2008 | Wang |
| 7,840,180 B2 | 11/2010 | Rosen |
| 8,360,366 B1 | 1/2013 | Chung |
| 9,260,335 B1 | 2/2016 | Miller et al. |
| 2002/0132577 A1* | 9/2002 | Draim ................. B64G 1/1085 455/12.1 |
| 2002/0160710 A1* | 10/2002 | Castiel ................. H04B 7/195 455/12.1 |
| 2003/0189136 A1* | 10/2003 | Maeda ................. B64G 1/242 244/158.4 |
| 2007/0032191 A1 | 2/2007 | Marko |

\* cited by examiner

SATELLITE COMMUNICATIONS SYSTEM WITH NON-GEOSYNCHRONOUS ORBITS

BACKGROUND

Many satellite communication systems utilize satellites in geosynchronous orbit. Such satellites are often referred to as geosynchronous equatorial orbit (GEO) satellites. GEO satellites appear to Earth-based ground stations to be stationary in the sky relative to a ground station on the Earth because GEO satellites have an orbital period equal to the rotational period of the Earth. The orbital altitude of a GEO satellite is 35,786 km (22,236 miles) above the Earth to achieve geosynchronous orbit.

Despite the prevalence of GEO satellites, satellites in geosynchronous orbit may have a number of unfavorable characteristics specific to a satellite communication system. For example, because GEO satellites orbit at a much higher altitude than satellites in low Earth orbit (LEO) or mid-Earth orbit (MEO), the cost to launch and maintain GEO satellites is higher than the cost to launch and maintain satellites at lower orbital altitudes such as LEO and MEO. Furthermore, due to the orbital altitude of GEO satellites being higher than satellites in LEO or MEO, the latency associated with RF communication between a ground station on Earth and a GEO satellites is higher than for satellites in a lower orbit.

Further still, all GEO satellites orbit the Earth at a standard altitude to achieve geosynchronous orbit. Many GEO satellites are in an equatorial orbit. In order to provide effective satellite operations, requirements exist that dictate minimum spacing between adjacent satellites at the geosynchronous orbit altitude. In turn, the geosynchronous orbit is divided into "orbital slots" to which a GEO satellite is assigned. The number of orbital slots at the geosynchronous orbit altitude that may be allocated for GEO satellites is limited, such that a limited number of GEO satellites may be in operation at any given time.

Accordingly, while GEO satellites remain prevalent in satellite systems, including satellite communication systems, the drawbacks of GEO satellites provide a need to adapt alternative satellite orbits for use in satellite communication systems and the like.

SUMMARY

In view of the foregoing, the present disclosure presents a satellite communication system that utilizes a non-GEO orbit (e.g., an MEO or LEO) to facilitate satellite communications between at least one ground station an at least one user terminal. Specifically, the satellite communications system facilitated by the present disclosure may address, at least in part, some of the unfavorable characteristics for GEO satellites described above. For example, because a satellite communication system according to the present disclosure utilizes a non-geosynchronous orbit, communication with a satellite in the satellite communication system may exhibit lower latency than those with GEO satellites. In addition, the LEO or MEO options that may be used by the satellite communication system may allow for the use of satellites that may otherwise be precluded from operating at the GEO orbital altitude due to limitations on the number of GEO satellites as described above. Further still, the LEO or MEO orbits described herein may provide continuous communication between ground stations and at least one satellite in at least one repeating sky track.

A satellite communication system facilitated by the present disclosure may allow for economic, robust, and relatively simple ground communication systems to be employed in the satellite communication system. For example, GEO satellites are widely used in communication systems because ground communication systems for communication with GEO satellites need not track a GEO satellite because GEO satellites appear stationary relative to the ground station on Earth. In contrast, LEO satellites or MEO satellites move in the sky as viewed from a ground station on the Earth. As such, ground communication systems for communication with LEO satellites and MEO satellites are more complicated than GEO ground communications systems to facilitate two-axis tracking of non-GEO satellites as the non-GEO satellites transit across the sky relative to a ground station. Such tracking of LEO and/or MEO satellites may include mechanical manipulation of an antenna or electrical manipulation of an antenna (e.g., using a phased array antenna or other directionalized antenna technology). Importantly, such ground communication systems include both gateways and user terminals. While relatively few gateways may be provided, a potentially large number of user terminals may be configured for communication with a satellite in a large scale satellite communication system (e.g., one in which Internet access is provided to many subscribers). In turn, user terminal equipment may be costly and/or complicated for use with non-GEO satellites, and the cost of such equipment may be prohibitive in view of a large number of user terminals that are often served by satellite communication systems.

The present disclosure features an orbit design that allows for continuous satellite communication between gateways and user terminals using non-GEO satellites in which the cost and/or complexity of such ground communication systems (including both gateways and user terminals) is significantly reduced as compared to other LEO or MEO satellite systems. Specifically, the present disclosure utilizes a satellite constellation in which each satellite in the constellation is at LEO or MEO and configured so that that all satellites follow a common, repeating ground track relative to the Earth. Correspondingly, with respect to a ground station, each satellite follows at least one common, repeating arc or sky track in the sky relative to a ground station. Thus, the tracking mechanism of ground stations of the satellite communication system may be simplified to allow for cost-effective communication equipment at each ground station to preserve continuous satellite communication in the satellite communication system. For instance, the ground stations may have less complex and lower cost antennas (e.g., phased arrays) for tracking satellites in a sky track in a limited extent of the sky relative to the ground station.

In this regard, the satellite communications system includes a plurality of satellites each traveling about the Earth in orbit such that each or all of the plurality of satellites of the satellite communication system follows a single repeating ground track relative to the surface of the Earth. Resources for control and station-keeping of the satellites may be reduced in the example in which all satellites in a satellite communication system have an orbit such that all the satellites in the satellite communication system follow a common, repeating ground track. The projected ground path of each satellite is the same and repeats relative to the surface of the Earth. Each respective orbit of the plurality of satellites may share orbital parameters but be offset relative to satellite epoch such that the plurality of satellites are spaced about (e.g., evenly) along the repeating projected ground path. In turn, at least one different respective one of the plurality of satellites may be continuously visible in a repeating sky track relative to a ground station on the Earth.

Each satellite may have an orbit that has an orbital period that is an integer factor of a sidereal day.

In addition, each of the plurality of satellites is equipped with communication equipment operable to communicate with at least one ground station. The communication equipment of the satellite may also facilitate communication with one or more (and preferably a plurality) of user terminals to facilitate the exchange of data between the at least one ground station and the one or more user terminals. For example, the plurality of satellites may be part of a data communication system to facilitate Internet access to the one or more user terminals provided by one or more gateways that communicate with the user terminals via respective ones of the plurality of satellites.

In one example, the orbit may be defined by a critical inclination angle (63.4 degrees relative to the Earth's equator), an orbital period of 6 sidereal hours, an apogee of 15,000 km above sea level, and a perigee of 6,000 km above sea level. Specifically, the perigee occurring relative to the southern hemisphere of the Earth. The orbit is oriented relative to the Earth to provide continuous satellite visibility between at least one of the plurality of satellites and a ground station in a targeted geographic region of the Earth on at least one repeating sky track relative to the ground station.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTION

Figure 1:
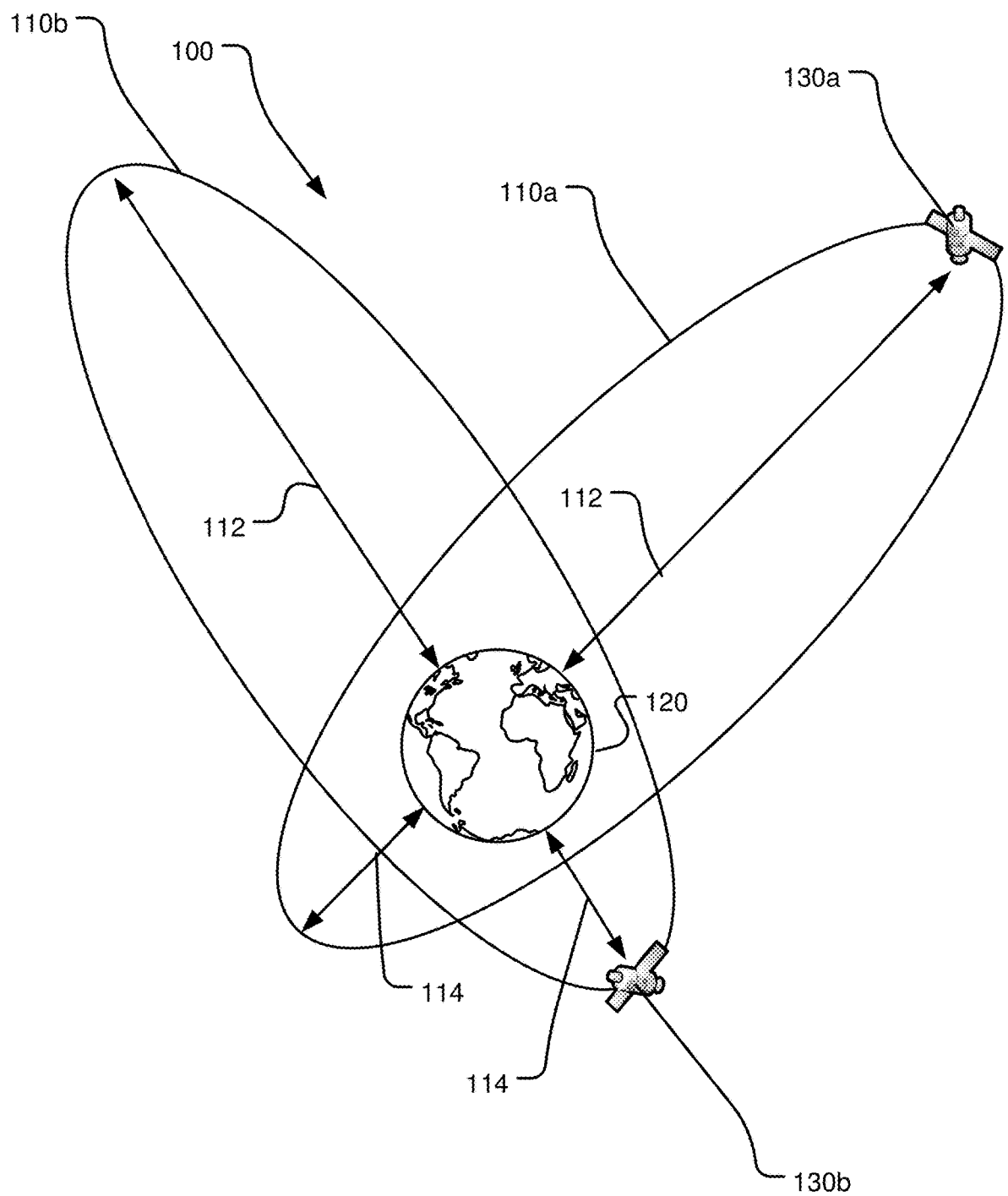
FIG. 1 depicts an embodiment of a satellite communications system comprising a plurality of satellites in orbit about Earth.

FIG. 1 depicts a simplified representation of a satellite communications system 100. The satellite communications system 100 generally includes a plurality of satellites 130 that move about the Earth 120 in corresponding orbits 110. The orbits 110 relative to the Earth 120 are represented by ellipses, as shown in FIG. 1, although it should be appreciated that FIG. 1 is not to scale and is for illustrative purposes only. Furthermore, while only two satellites, including a first satellite 130*a* and a second satellite 130*b* are shown in a first orbit 110*a* and a second orbit 110*b* respectively, additional satellites and corresponding orbits may be provided in other examples. In one particular example of the satellite communications system 100 that is described in greater detail below, twelve satellites transit about the Earth 120 in respective orbits. Each of the respective orbits 110 for the plurality of satellites 130 may have shared orbital parameters such that a shape of each orbit 110 relative to the Earth 120 is the same. For example, a satellite communication system 100 may be provided in which all satellites of the satellite communication system have an orbit with the same shape, but with satellites offset in satellite epoch such that each of the satellites is in a different respective portion of the repeating ground track. For instance, each orbit 110 may have a shared or common inclination, apogee, perigee, semimajor axis, orbital period, argument of perigee, and/or longitude of ascending node.

Thus, a ground track for each or all of the plurality of satellites may be of the same shape and follow a common ground track relative to the Earth. Each orbit 110 may be offset in relation to satellite epoch. In one example, the orbital period for each orbit 110 may be an integer factor of a sidereal day (e.g., the orbital period may be 12 sidereal hours, 8 sidereal hours, 6 sidereal hours, 4 sidereal hours, 2 sidereal hours, or 1 sidereal hour). A sidereal day is the time it takes for Earth to make one rotation around its axis and is approximately 23 hours, 56 minutes and 4.1 seconds. A sidereal hour is $\frac{1}{24}$ of a sidereal day. In any regard, each of the plurality of satellites 130 may follow a common, repeating ground path. By offsetting the plurality of satellites 130 with respect to epoch, each of the plurality of satellites 130 may be spaced along the common, repeating ground path. In one example, each of the plurality of satellites 130 is offset in epoch such that the plurality of satellites 130 are evenly spaced within the common, repeating ground track of the satellite communication system 100

The satellite communications system 100 may facilitate communication between ground stations on the Earth. For example, one ground station may be a satellite gateway that acts as a communication gateway to provide Internet access to a plurality of ground stations comprising user terminals on the Earth by way of communication with a satellite of the plurality of satellites. In this regard, each of the plurality of satellites 130 include communication equipment to facilitate communication with one or more ground stations on Earth 120. For example, the communication equipment may include radiofrequency (RF) transmitters, receivers, and/or transceivers capable of transmitting and/or receiving RF signals. The RF signals may include encoded digital data according to any appropriate encoding scheme for communication. Each satellite may also include a communications module executed by a computing device on the satellite to facilitate communications. In turn, the satellite communication system 100 may provide continuous communication between a gateway and a plurality of user terminals (e.g., which may correspond to subscribers of a communication service facilitated by the plurality of satellites 130).

In one example, a given sky track in which at least one of the plurality of satellites 130 is continuously visible to a gateway and at least one (and preferably a plurality) of user terminals to provide communication coverage (e.g., internet access) to user terminals in a geographic area of interest, which may correspond to a continent-level, country-level, or region-level service area. In some examples, user terminals in different respective geographic areas may be assigned to different sky tracks of the satellite communications system 100 to facilitate communication with one or more gateways. Moreover, a single gateway may communicate to more than one different satellite in different respective ground tracks at the same time to provide distinct communications channels (e.g., to different ones or subsets of a plurality of user terminals). In this regard, different subsets of subscribers or user terminals may be served by a single gateway using different respective satellites.

In an example of the satellite communications system 100, the plurality of satellites 130 may each be configured as a "bent pipe" satellite, wherein the satellite may frequency convert the received carrier signals before retransmitting these signals to their destination, but otherwise perform little or no other processing on the contents of the signals. There could be a single carrier signal for each service spot beam of a satellite or multiple carriers in different embodiments. Similarly, single or multiple carrier signals could be used for feeder spot beams. A variety of physical layer transmission modulation and coding techniques may be used by the satellite communications system 100 in accordance with certain embodiments, including those defined with the DVB-S2 standard. For other embodiments, a number of configurations are possible.

The plurality of satellites 130 may each operate in a multi-beam mode, transmitting a number of spot beams, each directed at a different region of the Earth 120. Spot beams may be generated in a variety of ways, including single-feed per beam, multiple-feed per beam, onboard beamforming, ground-based beamforming, and the like. Each spot beam may be used to communicate between a satellite and a large group (e.g., thousands) of user terminal systems (e.g., user terminals within user systems of subscribers of the communication service facilitated by the satellite communications system 100). The signals transmitted from the satellite may be received by one or more user terminals, via a respective user antenna. In some embodiments, some or all of the user systems include one or more user terminals and one or more customer premise equipment (CPE) devices. User terminals may include modems, satellite modems, routers, or any other useful components for handling the user-side communications. Reference to "users" should be construed generally to include any user (e.g., subscriber, consumer, customer, etc.) of services provided over the satellite communications system 100.

The orbits 110 of the plurality of satellites 130 may be configured relative to the Earth 120 to provide desirable characteristics related to communication, satellite operation, ground station design, or other benefits as will be described in greater detail herein. For example, an orbit 110 may be a critically inclined orbit. A critically inclined orbit is one that is inclined at 63.4 degrees relative to the equatorial plane of the Earth 120. Satellites traveling in a critically inclined orbit experience zero apogee drift. Accordingly, the duration and/or frequency of station-keeping operations may be minimized for satellites in orbit at a critical inclination. In turn, the critically inclined orbit 110 may reduce fuel consumption of each of the plurality of satellites 130 due to the reduction in station-keeping operations.

In addition, the orbit 110 may have an apogee 112 and a perigee 114 that are arranged relative to the Earth 120 to facilitate beneficial characteristics for satellite communication. In some examples, the orbits 110 may be circular orbits. In other examples, the orbits 110 may be elliptical. Specifically, the orbit 110 may have an apogee 112 of 15,000 km and a perigee 114 of 6,000 km. This example includes an eccentricity of 0.26. Regardless of whether circular or elliptical, the semimajor axis of the orbit 110 may be between about 8,000 km and 17,000 km. In examples where the orbits 110 are elliptical, the eccentricity of the orbit may be between 0 and 0.5. In another example, the orbit 110 may include a semimajor axis of 16,727 km, 4 orbits of the Earth per day, a maximum eccentricity of 0.26, and a perigee of 6,000 km. In yet another example, the orbit 110 may include a semimajor axis of 14,412 km, 5 orbits of the Earth per day, a maximum eccentricity of 0.14, and a perigee of 6,000 km. Another example orbit 110 includes a semimajor axis of 12,759 km, 6 orbits of the Earth per day, a maximum eccentricity of 0.03, and a perigee of 6,000 km. In another example, the orbit 110 may include a semimajor axis of 8,013 km, 12 orbits of the Earth per day, a maximum eccentricity of 0.16, and a perigee of 350 km.

In examples that include elliptical orbits, the perigee 114 may occur over the Southern hemisphere of the Earth 120, as shown in FIG. 1 (i.e., such that a satellite is over the Southern hemisphere when at perigee 114). In turn, the apogee 112 occurs over the Northern hemisphere of the Earth 120 (i.e., such that a satellite is over the Northern hemisphere when at apogee 112). Such an arrangement maximizes a duration in which the plurality of satellites 130 are each capable of communicating with ground stations in the Northern hemisphere. That is, because a velocity of the satellite 130 is at its slowest near the apogee of the orbit 110 and the apogee is disposed over the Northern hemisphere, each of the plurality of satellites 130 may slow and experience a longer duration in which the satellite 130 is capable of communication with ground stations on the Earth 120 in the northern hemisphere. This is desirable as many desirable targeted satellite geographic regions exist in the Northern hemisphere, including the North American landmass, European landmass, and much of the Asian landmass.

As described above, a satellite communication system 100 may provide a ground track that regularly repeats along the same locations relative to the surface of the earth 120. In this regard, the orbital period for each orbit 110 in the system 100 may be a factor (e.g., an integer factor) of a sidereal day. By integer factor, it is meant that the orbital period divides the 24 sidereal hours in a sidereal day without remainder. For example, the orbital period of each satellite 130 may be 6 sidereal hours. While a 6 sidereal hour orbital period is discussed, other orbital periods that are also evenly divisible factors of a sidereal day such as an orbital period of 12 sidereal hours, 8 sidereal hours, 6 sidereal hours, 4 sidereal hours, 2 sidereal hours, or 1 sidereal hour are also contemplated. In any regard, each of the plurality of satellites 130 may follow a single, repeating ground track relative to the surface of the Earth 120 and may be offset in satellite epoch. Each of the plurality of satellites 130 may include a navigation module operative to maintain the plurality of satellites 130 in orbit 110. Further still, the epoch of each of the plurality of satellites 130 may be offset to provide a predetermined spacing between the plurality of satellites 130 along the repeating ground track. For example, the spacing between the plurality of satellites 130 in the ground track may be evenly spaced.

An orbit 110 having the foregoing orbital parameters may facilitate a number of beneficial characteristics. As briefly stated above, these characteristics may include improved satellite operational characteristics by reducing station-keeping operations and, in turn, reducing fuel consumption of each of the plurality of satellites 130. In addition, the inclined orbit having the apogee and perigee characteristics described above may allow the plurality of satellites 130 to operate almost entirely in sunlight, which reduces battery capacity requirements because the plurality of satellites 130 may not be required to operate on battery power for significant portions of the orbit 110.

In addition, as described in greater detail below, the orbit 110 may allow for improved communications operations with the satellites. Specifically, the orbit 110 may facilitate continuous communication between a ground station and at least one of the plurality of satellites 130. Furthermore, it will be understood that because each of the plurality of satellites 130 follows a common ground track, each of the plurality of satellites 130 will correspondingly each follow a common, repeating sky track relative to a ground station on Earth 120. That is, the locations directly below the orbital path of each satellite is the same for the plurality of satellites. By "directly below," the locations of the common, repeating ground track may represent the intersection of the Earth's surface with an imaginary line extending from the center of the Earth to a satellite. The common, repeating ground track represents the locations on the Earth over which each satellite will pass directly overhead at the zenith in the frame of reference of an observer on the surface of the Earth. Each of the plurality of satellites 130 will follow the same path across the sky from the perspective of a ground station on Earth 120. In turn, ground station antenna requirements may be simplified by permitting less complex tracking when used to communicate with the plurality of satellites 130 in orbit 110.

Figure 2:
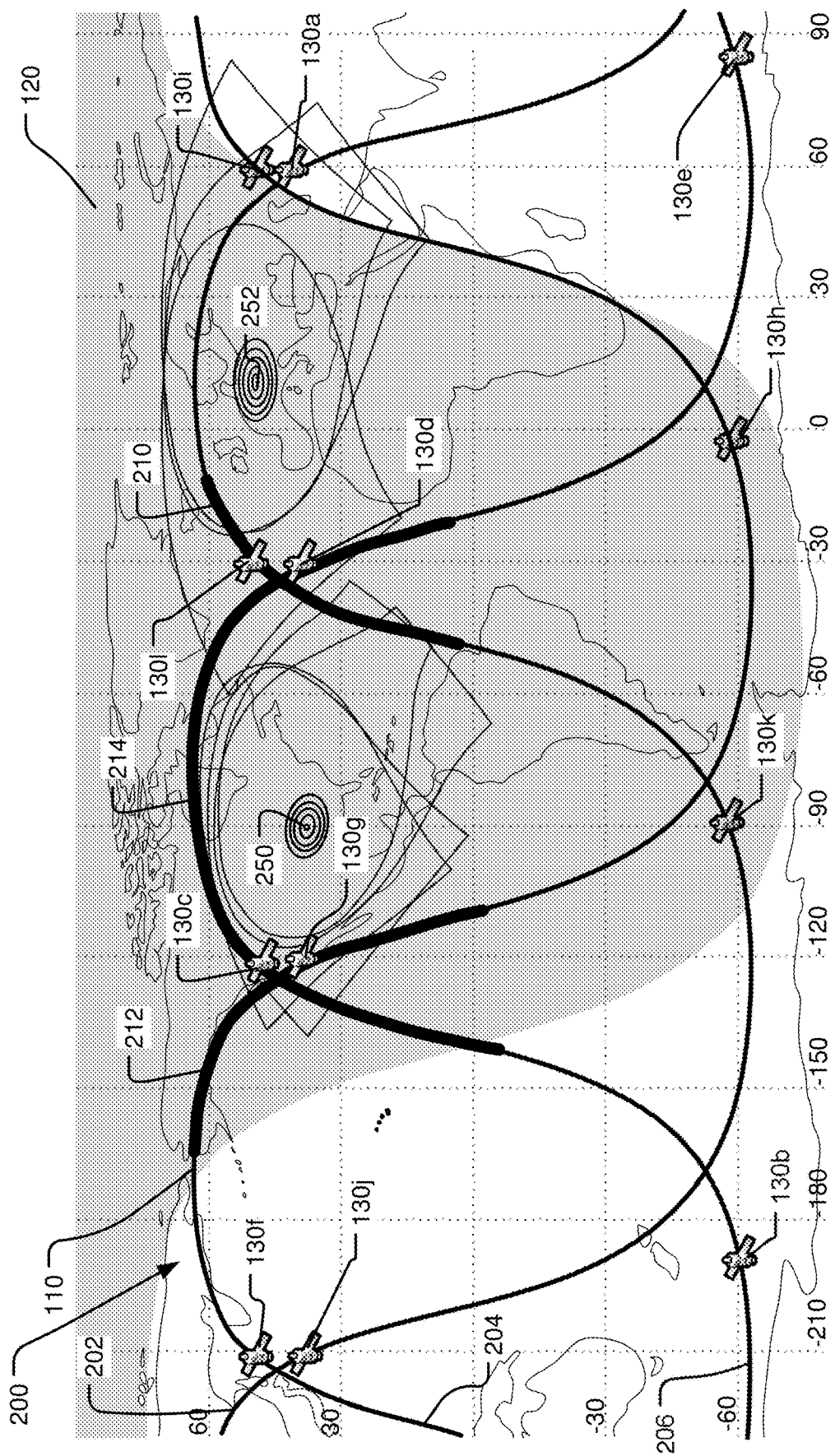
FIG. 2 depicts a map of Earth with a ground track of the satellite system depicted relative to ground stations on Earth.

FIG. 2 depicts a ground path of the orbit 110 on a map of the Earth 120. The orbit 110 may have a repeating ground track 200 that is constant relative to the surface of the Earth 120. As the orbital period of the orbit 110 may be an evenly divisible factor of a sidereal day (e.g., 6 sidereal hours) and each satellite may orbit the Earth multiple times in a sidereal day, the ground track 200 of the orbit 110 appears as multiple interleaved ground track projections when projected onto a flat representation of the Earth 120 such that each ground track projection portion represent a portion of the orbit 110 as it repeatedly tracks across the surface of the Earth 120. Thus, the ground projection may be represented by a first ground track projection 202, a second ground track projection 204, and a third ground track projection 206 that collectively define a continuous ground track 200 relative to the surface of the Earth 120. The appearance of the orbit 110 as a plurality of interleaved ground track projections is a limitation of the projected map view shown in FIG. 2, however, each of the first ground track projection 202, second ground track projection 204, and the third ground track projection 206 represents a portion of the continuous ground track 200 for the orbit 110 at different satellite epoch of the orbit. Each of the plurality of satellites 130 of the satellite communications system 100 is shown in FIG. 2. In this example, the satellite communication system includes 12 satellites such that satellites 130a-130l are shown, but a system need not be limited to that number. and as can be appreciated, each of the plurality of satellites 130 follows the common ground track 200 represented by the interleaved ground track projections.

Also shown in FIG. 2 is a ground station comprising a gateway 250 that is located in central North America. FIG. 2 also depicts a gateway 252 located in central Europe. The gateway 250 and the gateway 252 may each include communication equipment that may be operable to communicate with the communication equipment of each of the plurality of satellites 130 in orbit 110 when a respective one of the plurality of satellites 130 is in view of the respective gateway along a sky track. Each of the gateway 250 and the gateway 252 may include receivers, transmitters, and/or transceivers capable of communicating with the communication equipment of each of the plurality of satellites 130. The gateway 250 and/or gateway 252 may include a communication module executed by a computing system at the respective ground station. The gateways 250 and 252 may also facilitate Internet communications by being in operative communication with a wide area network, including the Internet.

In the example depicted in FIG. 2, the orbit 110 may provide communication coverage to user terminals in at least portions of North America and Europe. Specifically, central North America and Europe may each be referred to as "targeted geographic areas" in which satellite communication is targeted to user terminals in those areas. Thus, satellite communication may be continuously provided between a gateway and user terminals in the targeted geographic areas by at least one of the plurality of satellites 130. While North America and Europe are shown for purposes of explanation, it may be appreciated that the orbit 110 may be arranged (e.g., the longitude of the ascending node may be controlled) to arrange the orbit 110 in a different relative position to the Earth 120 to target other geographic areas of interest. Also, while ground stations are shown in central North America and Europe in FIG. 2, the orbit configuration depicted in FIG. 2 may also facilitate a repeating sky track relative to a targeted geographic area in other geographic areas (e.g., in Japan, China, Russia, India, other southeast Asian countries, or other regions without limitation) although not expressly shown in FIG. 2.

The gateway 250 has extents of visibility relative to the plurality of satellites 130 due to, among other factors, the curvature of the Earth, geographic formations, or other obstacles that block or otherwise preclude line-of-sight communication with the plurality of satellites 130. In this regard, a first extent of visibility 210 of the orbit 110 for the gateway 250 along the first ground track projection 202 is shown as a bolded gray portion of the first ground track projection 202 in FIG. 2. A second extent of visibility 212 of the orbit 110 for the gateway 250 is depicted as a bolded gray portion of the second ground track projection 204 in the map view of FIG. 2. In addition, a third extent of visibility 214 of the orbit 110 may be defined as a bolded gray portion of the third ground track projection 206. In this regard, in the time depicted in FIG. 2, satellite 130l is within the first extent of visibility 210 of the gateway 250, satellite 130g is within the second extent of visibility 212 of the gateway 250, and satellite 130c and satellite 130d may be within the third extent of visibility 214 of the gateway 250. In this regard, the gateway 250 may be capable of simultaneous communication with each of the satellites in the different respective sky tracks relative to the gateway 250 defined by the extents of visibility 210, 212, and 214.

The first extent of visibility 210, the second extent of visibility 212, and the third extent of visibility 214 for the gateway 250 may facilitate multiple instances in which the orbit 110 passes within view of the gateway 250. As shown in FIG. 2, a different respective one of the plurality of satellites 130 may be in each of the extents of visibility for the gateway 250. Thus, the gateway 250 may be in simultaneous communication with a respective one or more of the plurality of satellites 130 as the satellite makes a pass relative to the gateway 250 in each of the extents of visibility as the satellite orbits the Earth 120.

Figure 3:
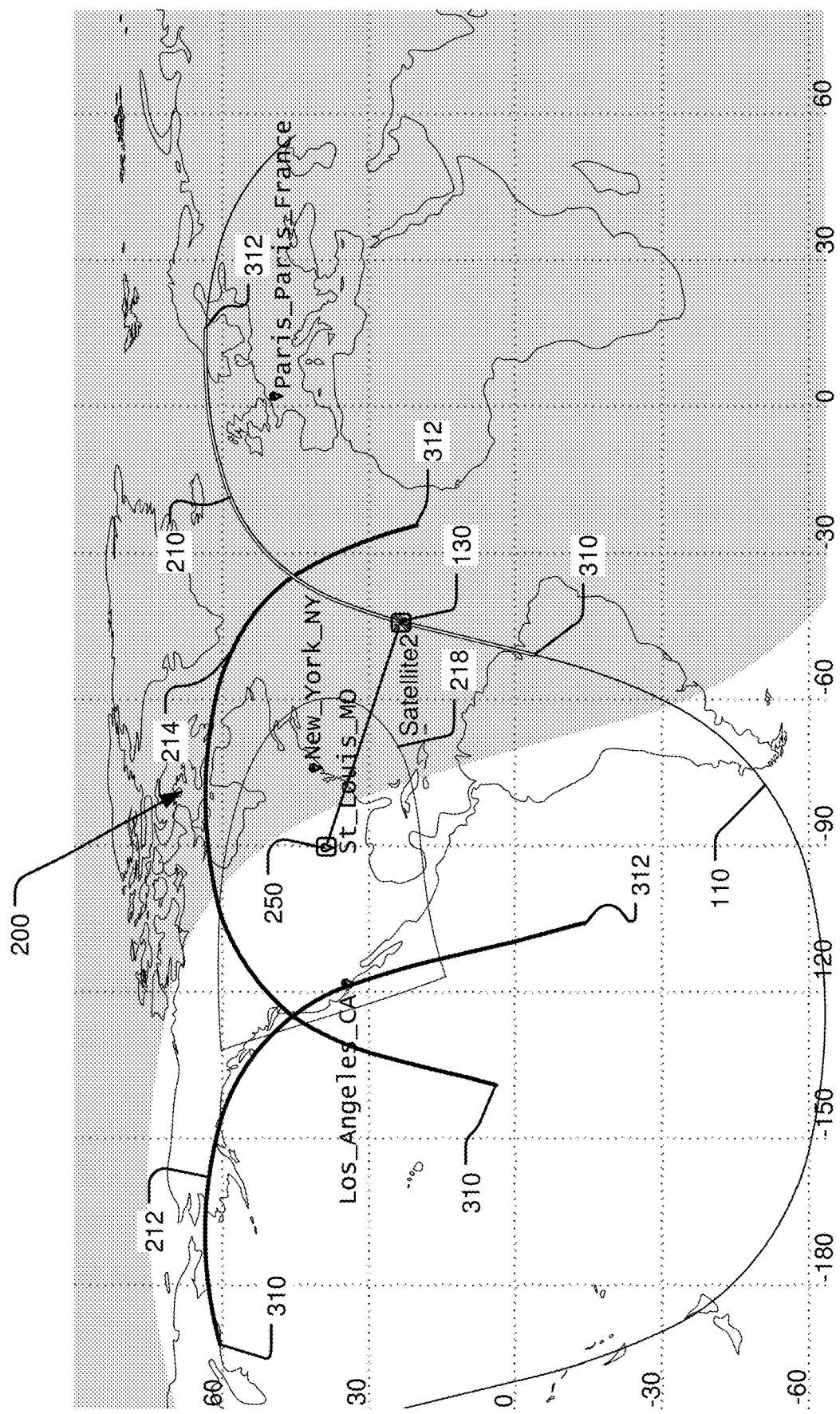
FIGS. 3-5 depict map views showing three extents of visibility relative to a ground station at three different satellite epochs in which a satellite is in different respective ones of the extents of visibility.

FIG. 3 shows a map view including the gateway 250 relative to a first extent of visibility 210, a second extent of visibility 212, and a third extent of visibility 214 along the repeating ground track 200 of the orbits 110 of the satellite communications system 100 (portions of the orbit 110 are omitted for clarity). In FIG. 3, a satellite 130 may be in the first extent of visibility 210 such that the gateway 250 may establish a communication link with the satellite 130. FIG. 3 further depicts a coverage area 218 within which user terminals (not shown) are capable of communicating with the satellite 130. As such, user terminals within the coverage area 218 may be provided communication services by the gateway 250 via the satellite 130 such that the user terminals in the coverage area 218 may exchange data messages via the satellite 130. That is, Internet service may be provided to the user terminals in the coverage area 218 by the satellite 130 and the gateway 250. As can be appreciated, the coverage area 218 may extend to generally all of the contiguous United States, much of Mexico, and much of Canada. Thus, the coverage area 218 provided by the satellite 130 may extend to a large targeted geographic area, including large portions of the North American continent.

Figure 4:
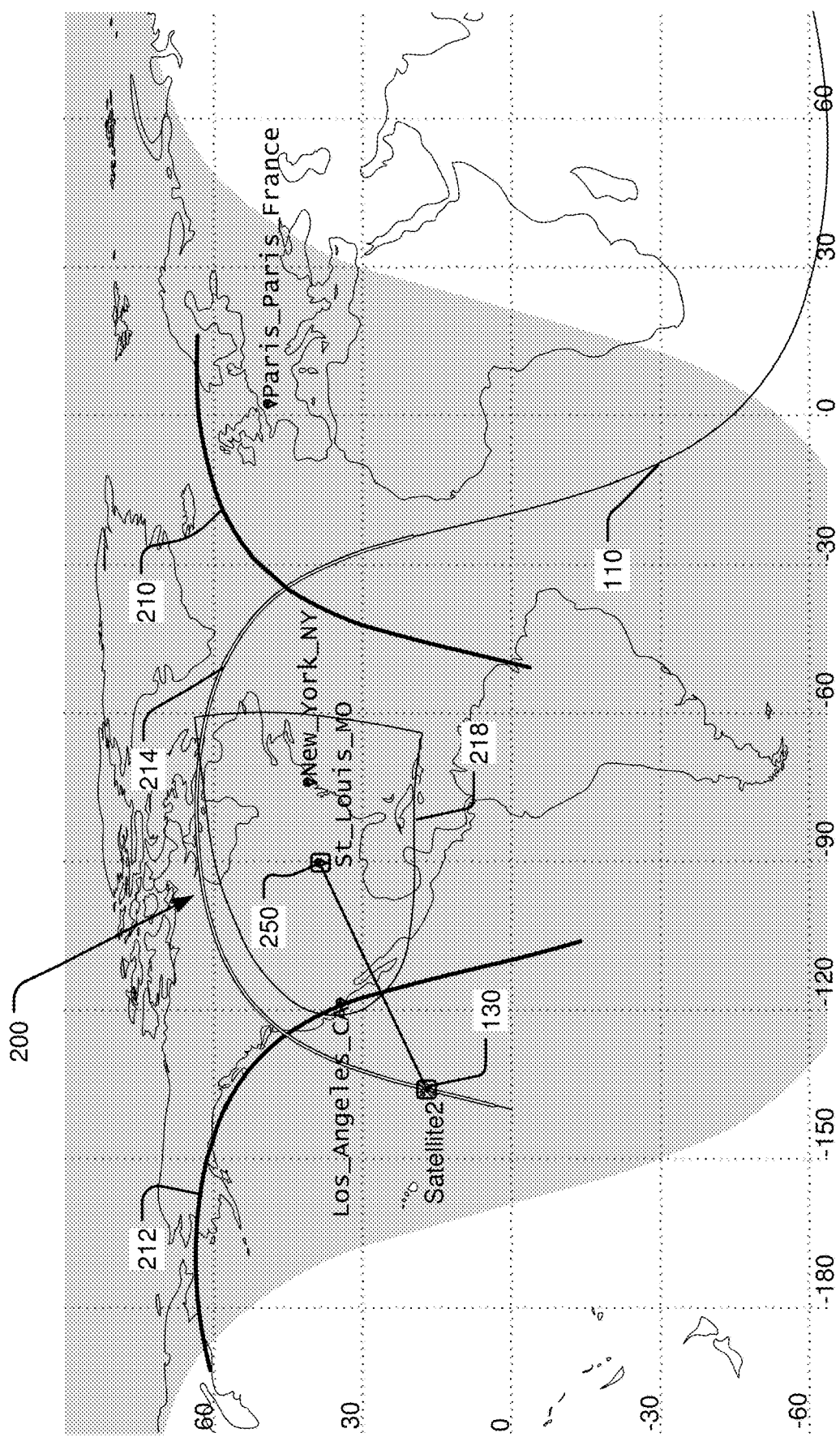
Figure 5:
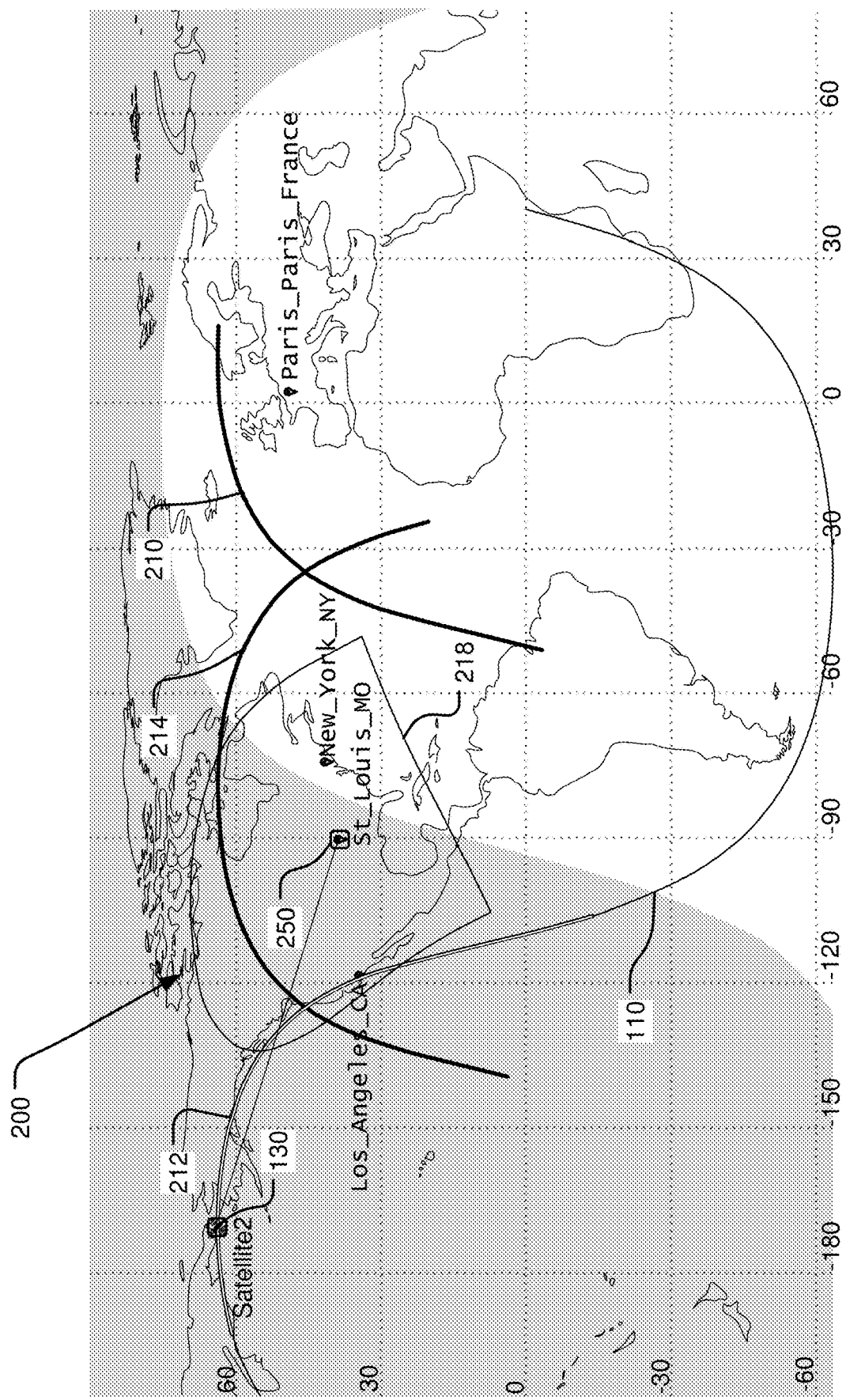

In FIG. 4, the satellite 130 has transited in orbit 110 such that the satellite 130 now is visible to the gateway 250 in the third extent of visibility 214 in a second time shown in FIG. 4. In this regard, the coverage area 218 of the satellite 130 also extends to a large portion of the contiguous United States. FIG. 5 depicts a third time in which the satellite 130 may be in a second extent of visibility 212 relative to the gateway 250 such that the coverage area 218 for the satellite 130 is shown for that time.

Specifically, a satellite may transit through an acquisition of signal (AOS) boundary 310, upon which the satellite becomes visible to the gateway 250 such that communication may be established with the satellite. The satellite may remain visible to the gateway 250 until the satellite transits through a loss of signal (LOS) boundary 312. Thus, a satellite of the plurality of satellites 130 may provide a pass relative to the ground station 250 as the satellite traverses from the AOS boundary 310 to the LOS boundary 312 for each respective extent of visibility 210, 212, and 214 for the gateway 250. The period in which the satellite 130 is included in the extent of visibility 212, the satellite 130 may appear to the gateway 250 in a first sky track relative to the gateway 250. Because all of the plurality of satellites 130 follow a repeating ground path, each of the plurality of satellites 130 may sequentially traverse the first sky track relative to the gateway 250.

Figure 6:
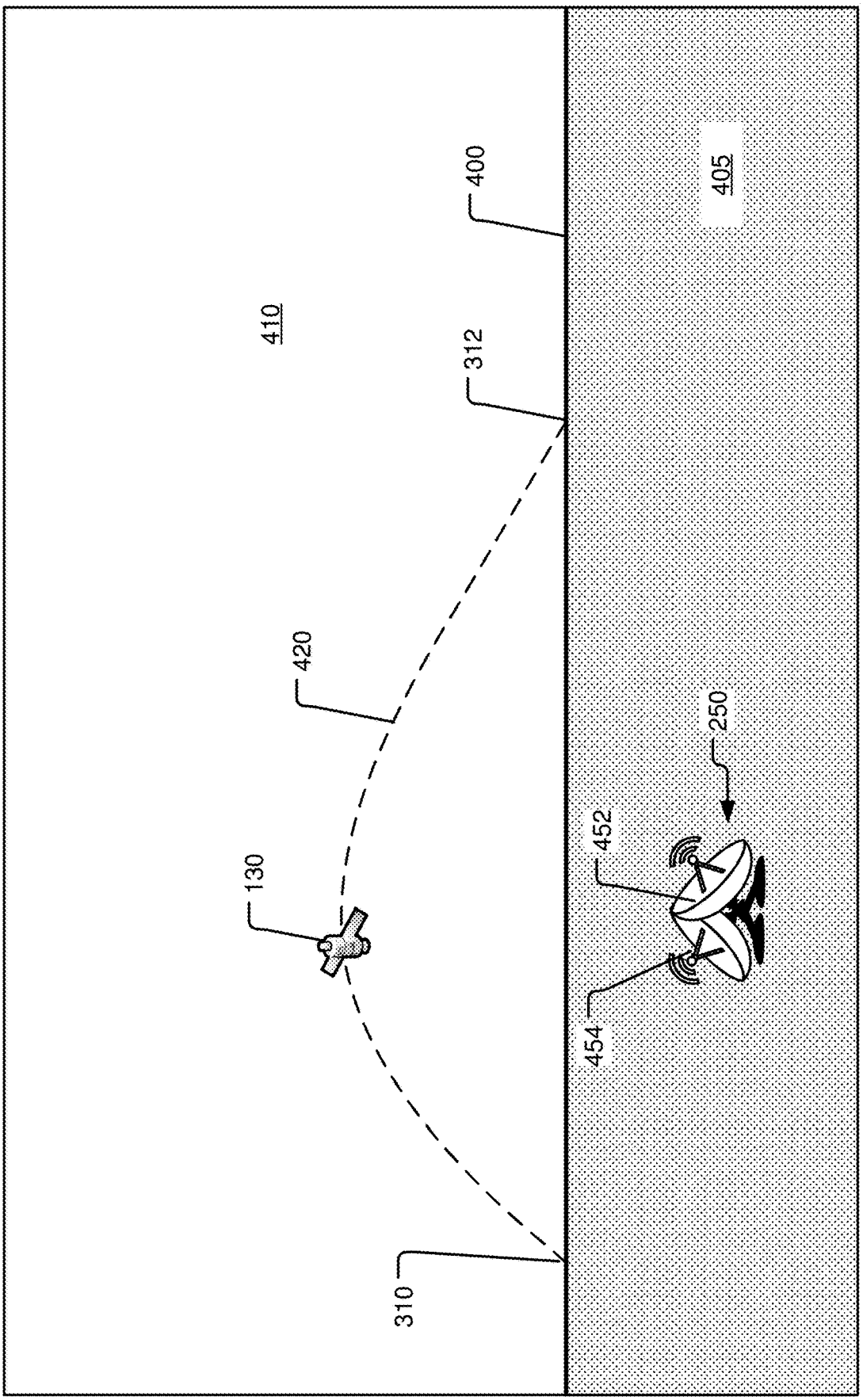
FIG. 6 depicts a simplified view from a ground station depicting a repeating sky track defined relative thereto.

For example, a simplified depiction of a repeating sky track 420 is depicted in FIG. 6. In FIG. 6, a representation of the local horizon at a gateway 250 is shown, including a horizon 400 that separates the Earth 405 and the sky 410 from the perspective of the gateway 250. The horizon 400 may be the actual horizon at the gateway 250 or may be an artificial horizon at some elevation angle above or below the actual local horizon of the gateway 250. In any regard, a repeating sky track 420 is shown that extends between an AOS boundary 310 in which a satellite 130 enters the extent of visibility for the gateway 250 and the LOS boundary 312 in which a satellite 130 exits the first extent of visibility 210 for the gateway 250. Because each of the plurality of satellites 130 follows an identical ground track 200, the orbit 110 defines a repeating sky track 420 relative to the gateway 250 in which the plurality of satellites 130 each sequentially traverse from the AOS boundary 310 to the LOS boundary 312 on the repeating sky track 420.

That is, as satellite 130 traverses toward the LOS boundary 312, at or before the time the satellite 130 exists the first extent of visibility 212 for the gateway 250, the next satellite along the repeating ground track 200 of the plurality of satellites 130 enters the first extent of visibility 212 by passing through the AOS boundary 310 such that the next satellite may establish communication with the gateway 250. The AOS for each successive satellite on the repeating sky track 420 may occur at or before LOS for the current satellite in the repeating sky track 420 to provide continuous satellite communication between the gateway 250 and at least one of the plurality of satellites 130 on the repeating sky track 420.

In this regard, the gateway 250 may include communication equipment capable of tracking satellites along the repeating sky track 420 relative to the gateway 250. For example, the gateway 250 may have at least two antennas, including a first antenna 452 and a second antenna 454. The first antenna 452 and the second antenna 454 may coordinate to provide constant communication with at least one of the plurality of satellites 130 in the repeating sky track 420. For example, the first antenna 452 may track a satellite 130 as it transits between the AOS boundary 310 and the LOS boundary 312. At the time of or before the first antenna 452 tracks satellite 130 as it passes the LOS boundary 312 (i.e., transits out of the visible extent of the gateway 250), the second antenna 454 may be tasked with acquiring communication with the next satellite as it enters the visible extent at the AOS boundary 310. Because an interruption in communication is undesirable, the first antenna 452 and the second antenna 454 may work in tandem to maintain communication using a handoff between a current satellite in the repeating sky track 420 and the next satellite to enter the repeating sky track 420. Thus, the handoff of communication between the first antenna 452 and the satellite 130g as it transits through the LOS boundary 312 may be seamless as the second antenna 454 may provide communication with the next satellite as it travels through the AOS boundary 310. In turn, the first antenna 452 may cycle back during the transit of the next satellite along the repeating sky track 420 tracked by the second antenna 454 such that the first antenna 452 is ready to acquire communication with a further subsequent satellite as that satellite passes the AOS boundary 310. The first antenna 452 and the second antenna 454 may alternatively provide communication with each successive satellite in orbit 110 as each successive satellite passes the AOS boundary 310 to provide continuous communication with at least one of the plurality of satellites 130 in orbit 110.

Figure 7:
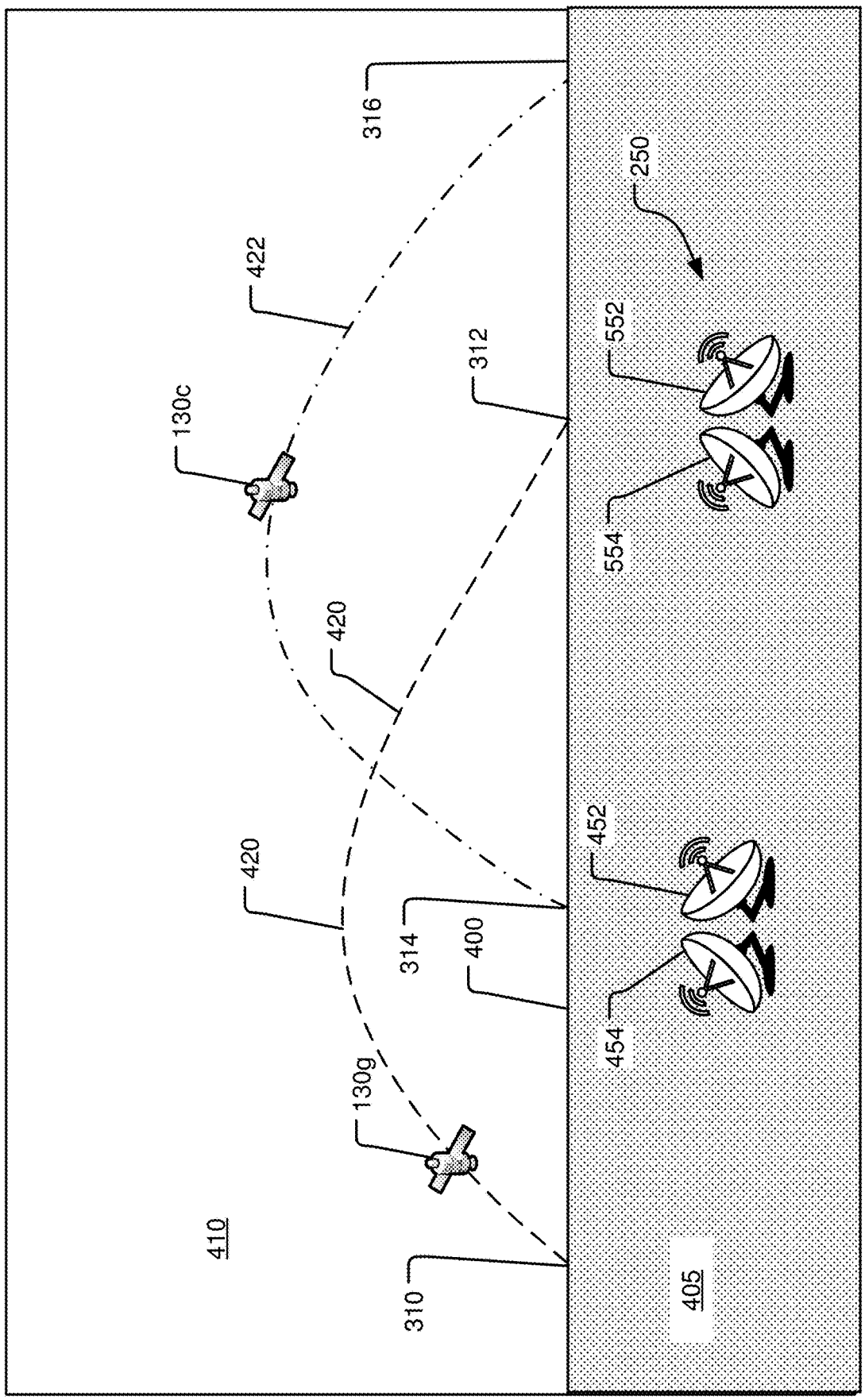
FIG. 7 depicts a simplified view from a ground station depicting two repeating sky tracks defined relative thereto.

Based on the foregoing discussion regarding the fact that a gateway 250 may have multiple extents of visibility occupied by different respective satellites at the same time, it may be appreciated that multiple repeating sky tracks may be provided relative to a gateway 250. Thus, with further reference to FIG. 7, a gateway 250 may be operative to track two different repeating sky tracks—repeating sky track 420 and repeating sky track 422—each corresponding with different extents of visibility of the orbit 110 for the gateway 250. That is, repeating sky track 420 may correspond to a first extent of visibility 210, as shown in FIGS. 2-5. The repeating sky track 422 may correspond to a second extent of visibility 212, as shown in FIGS. 2-5. For the purpose of discussion of FIG. 7, the repeating sky track 422 may be defined between an AOS boundary 314 and a LOS boundary 316. In the example depicted in FIG. 7, satellite 130g is in the first repeating sky track 420. A different one of the plurality of satellites 130 (e.g., satellite 130c) than the satellite 130g may be simultaneously transiting along repeating sky track 442 while satellite 130c transits along repeating sky track 420. That is, satellite 130c may be visible concurrently to satellite 130g, albeit in different sky tracks. Like the foregoing discussion of the repeating sky track 420, the repeating sky track 422 may be fixed relative to the gateway 252 and successively occupied by different ones of the plurality of satellites 130.

Accordingly, the ground station may have a third antenna 552 and a fourth antenna 554 to track successive ones of the plurality of satellites 130 along the repeating sky track 422. Like the first antenna 452 and the second antenna 454 discussed above, the third antenna 552 and the fourth antenna 554 may alternatively track successive ones of the plurality of satellites 130 as they transit through the repeating sky track 442 such that one of the third antenna 552 and the fourth antenna 554 acquires a new satellite passing through the AOS boundary 314 at or before the other antenna of the third antenna 552 and the fourth antenna 554 loses communication with an existing satellite in the repeating sky track 422 passing through the LOS boundary 316.

The number of sky tracks simultaneously visible for a given targeted geographic extent may not be limited to one or two but could include at least three sky tracks in which at least one of the plurality of satellites 130 is visible to a gateway 250. For instance, as can be appreciated with returned reference to FIGS. 2-5, the first extent of visibility 210, the second extent of visibility 212, and the third extent of visibility 214 may create different respective sky tracks relative to the gateway 250. Furthermore, the same repeating ground track 200 of the orbit 110 may also provide a plurality of extents of visibility and corresponding repeating sky tracks to a gateway 252 in central Europe as well. While not shown, multiple sky tracks may also be provided to other gateways in other targeted geographic locations (e.g., in Asia) using the orbit 110 that provides the sky tracks relative to the gateway 250 and the gateway 252. Accordingly, the orbit 110 provides a robust communication system as a plurality of ground stations in different targeted geographic regions may be in communication with a plurality of satellites simultaneously.

Figure 8:
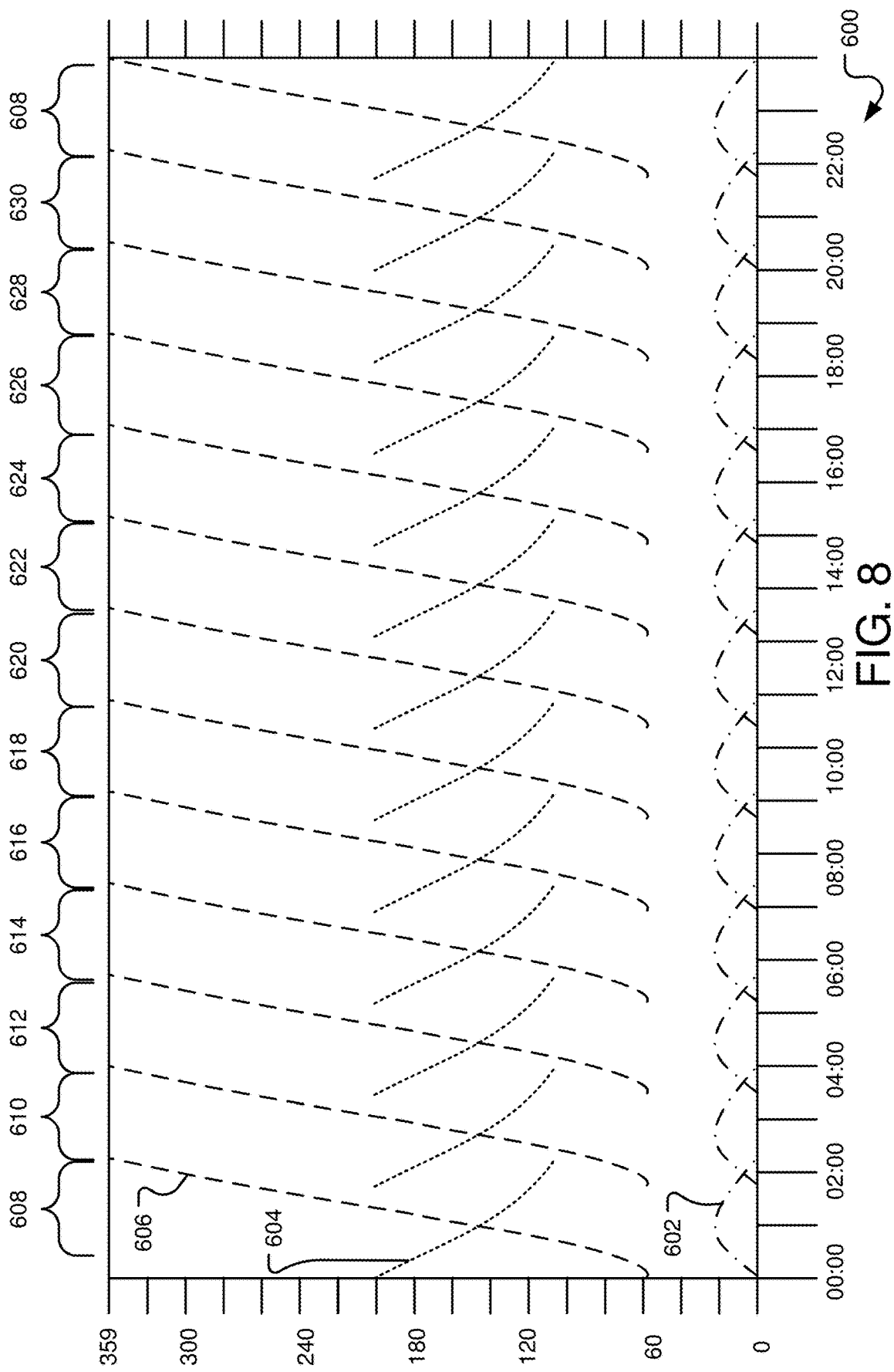
FIGS. 8-10 depict different path pass characteristics for a plurality of sky tracks visible to a ground station.
Figure 9:
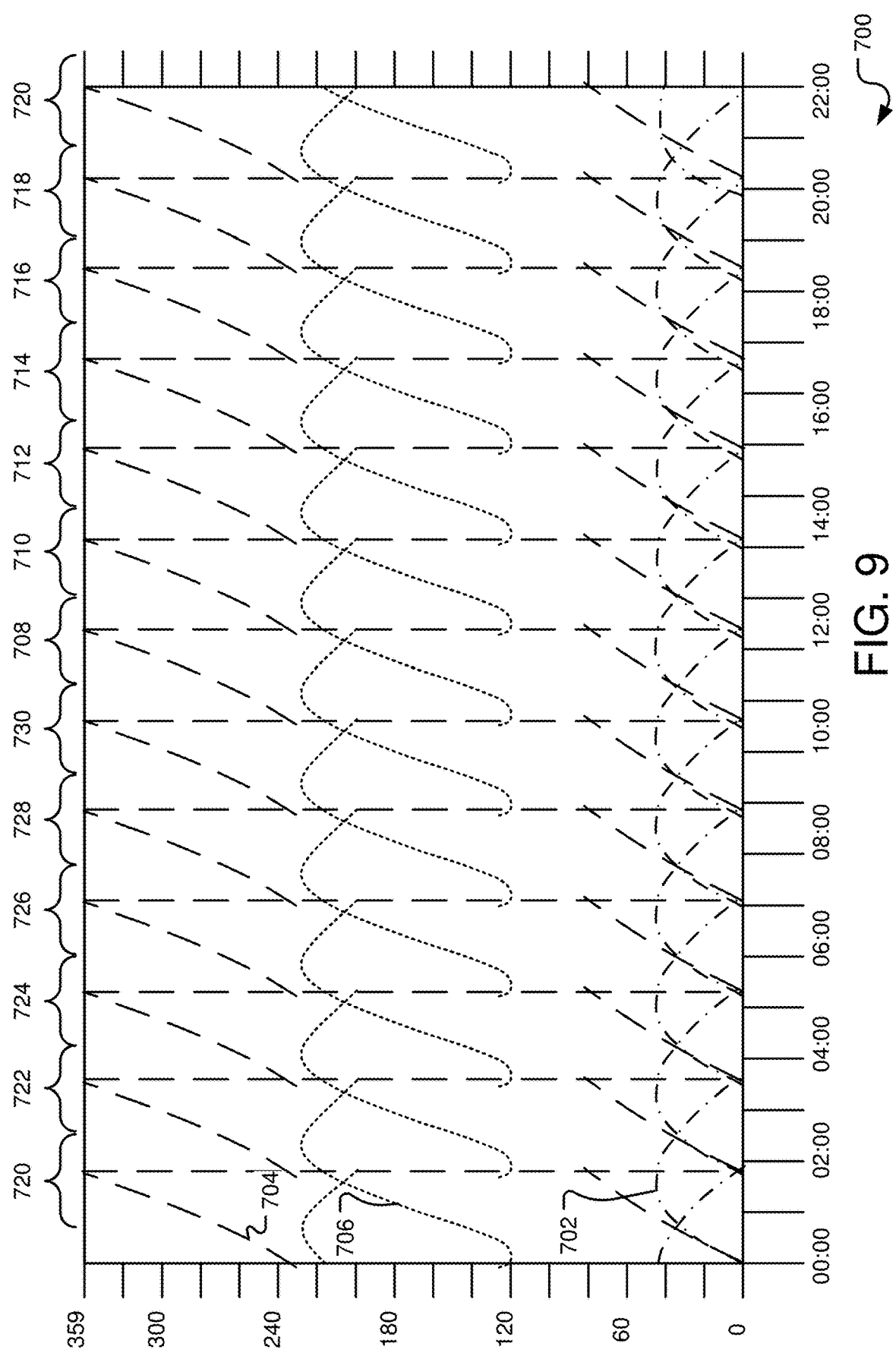
Figure 10:
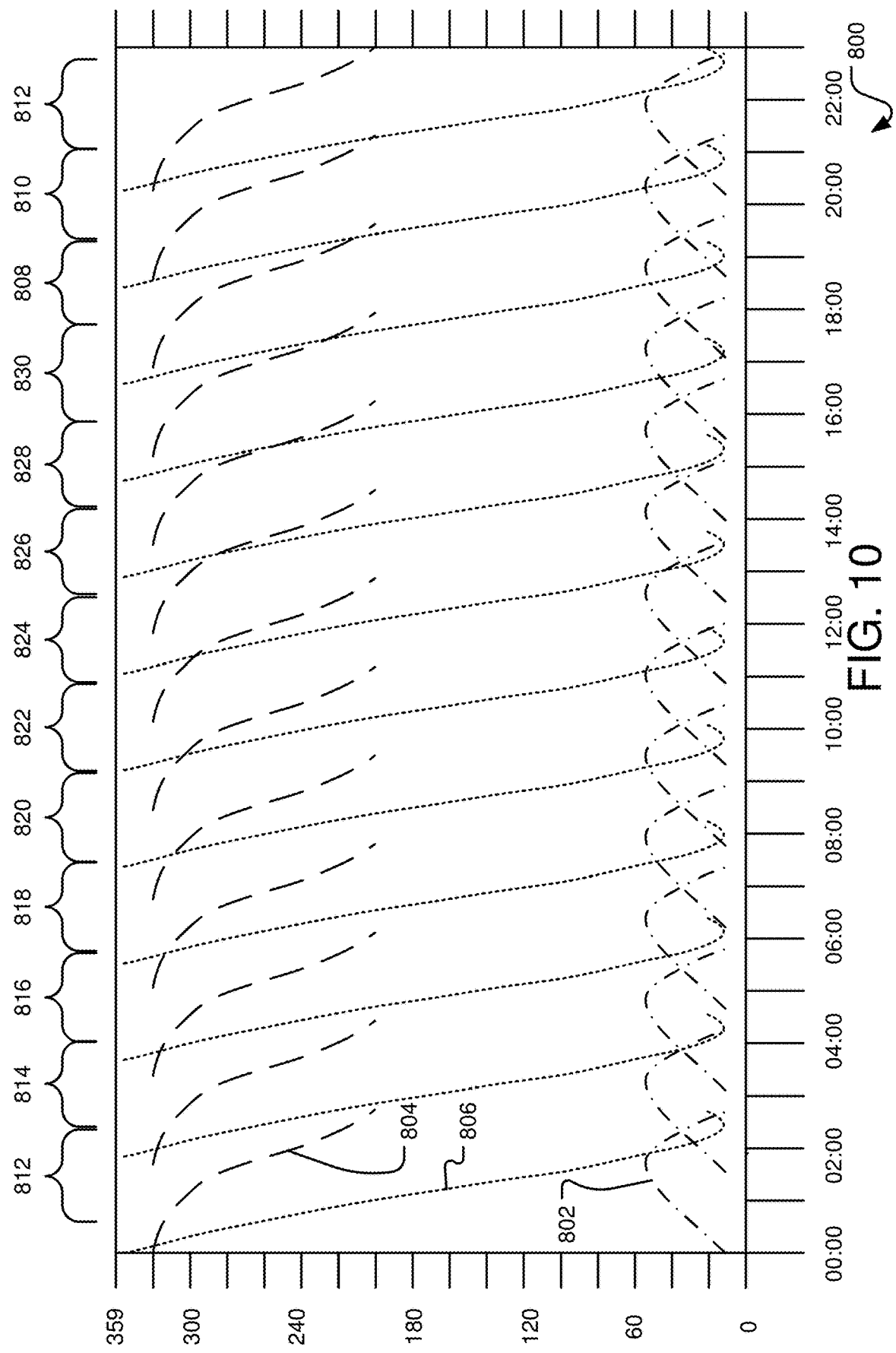

FIGS. 8-10 depict plots representative of three different repeating sky tracks relative to a given ground station. Specifically, FIG. 8 represents the characteristics of a repeating sky track 600. The plot in FIG. 8 has a left vertical axis representing degree values, a right vertical axis representing range values, and the horizontal axis represents time. A pass elevation 602 is represented in a dash-dot line, a pass azimuth 604 is represented as a dashed line, and a pass range 606 is represented as a dotted line. In this regard, pass elevation 602 and pass azimuth 604 are measured relative to the left axis in degrees corresponding to the elevation angle and azimuth angle relative to the ground station. As may also be appreciated in FIG. 8, a number of satellite epochs are represented corresponding to passes of each satellite in the plurality of satellites 130 in the sky track 600. Thus, a first satellite epoch 608 in which a first satellite 130a is visible to the ground station is followed successively by a second satellite epoch 610 in which a second satellite 130b is visible to the ground station, a third satellite epoch 612 in which a third satellite 130c is visible to the ground station, a fourth satellite epoch 614 in which a fourth satellite 130d is visible to the ground station, a sixth satellite epoch 618 in which a sixth satellite 130e is visible to the ground station, a seventh satellite epoch 620 in which a seventh satellite 130f is visible to the ground station, an eighth satellite epoch 622 in which an eighth satellite 130g is visible to the ground station, a ninth satellite epoch 624 in which a ninth satellite 130h is visible to the ground station, a tenth satellite epoch 626 in which a tenth satellite 130i is visible to the ground station, an eleventh satellite epoch 628 in which an eleventh satellite 130j is visible to the ground station, and a twelfth satellite epoch 630 in which a twelfth satellite 130l is visible to the ground station. In turn, a first satellite epoch 608 follows the twelfth satellite epoch 630, in which the first satellite 130a again becomes visible to the ground station, thus representing a complete cycle through each of the plurality of satellites 130 passing along the sky track 600. As can be appreciated, the pass elevation 602, pass azimuth 604, and pass range 606 follow a repetitive cycle for each successive satellite epoch, indicating the repeating sky track 600, which remains constant. Each satellite epoch may be at least around 2 sidereal hours, such that the twelve satellites defining the twelve satellite epochs span a full day. However, depending on the length of the sky track relative to the ground station, other numbers of satellites and epoch durations may be provided to facilitate continuous communication with at least one of the plurality of satellites 130.

FIG. 9 represents the characteristics of a repeating sky track 700. The plot in FIG. 9 has a left vertical axis representing degrees, a right vertical axis representing range values, and the horizontal axis represents time. A pass elevation 702 is represented in a dash-dot line, a pass azimuth 704 is represented as a dashed line, and a pass range 706 is represented as a dotted line. In this regard, pass elevation 702 and pass azimuth 704 are measured relative to the left axis with elevation angle and azimuth angle relative to the ground station. As may also be appreciated in FIG. 9, a number of satellite epochs are represented corresponding to passes of each satellite in the plurality of satellites 130 in the sky track 700. Thus, a first satellite epoch 708 in which a first satellite 130a is visible to the ground station is followed successively by a second satellite epoch 710 in which a second satellite 130b is visible to the ground station, a third satellite epoch 712 in which a third satellite 130c is visible to the ground station, a fourth satellite epoch 714 in which a fourth satellite 130d is visible to the ground station, a sixth satellite epoch 718 in which a sixth satellite 130e is visible to the ground station, a seventh satellite epoch 720 in which a seventh satellite 130f is visible to the ground station, an eighth satellite epoch 722 in which an eighth satellite 130g is visible to the ground station, a ninth satellite epoch 724 in which a ninth satellite 130h is visible to the ground station, a tenth satellite epoch 727 in which a tenth satellite 130i is visible to the ground station, an eleventh satellite epoch 728 in which an eleventh satellite 130j is visible to the ground station, and a twelfth satellite epoch 730 in which a twelfth satellite 130l is visible to the ground station. In turn, a first satellite epoch 708 follows the twelfth satellite epoch 730, in which the first satellite 130a again becomes visible to the ground station, thus representing a complete cycle through each of the plurality of satellites 130 passing along the sky track 700. As can be appreciated, the pass elevation 702, pass azimuth 704, and pass range 706 follow a repetitive cycle for each successive satellite epoch, indicating the repeating sky track 700, which remains constant.

FIG. 10 represents the characteristics of a repeating sky track 800. The plot in FIG. 10 has a left vertical axis representing degrees, a right vertical axis representing range values, and the horizontal axis represents time. A pass elevation 802 is represented in a dash-dot line, a pass azimuth 804 is represented as a dashed line, and a pass range 806 is represented as a dotted line. In this regard, pass elevation 802 and pass azimuth 804 are measured relative to the left axis with elevation angle and azimuth angle relative to the ground station. As may also be appreciated in FIG. 10, a number of satellite epochs are represented corresponding to passes of each satellite in the plurality of satellites 130 in the sky track 800. Thus, a first satellite epoch 808 in which a first satellite 130a is visible to the ground station is followed successively by a second satellite epoch 810 in which a second satellite 130b is visible to the ground station, a third satellite epoch 812 in which a third satellite 130c is visible to the ground station, a fourth satellite epoch 814 in which a fourth satellite 130d is visible to the ground station, a sixth satellite epoch 818 in which a sixth satellite 130e is visible to the ground station, a seventh satellite epoch 820 in which a seventh satellite 130f is visible to the ground station, an eighth satellite epoch 822 in which an eighth satellite 130g is visible to the ground station, a ninth satellite epoch 824 in which a ninth satellite 130h is visible to the ground station, a tenth satellite epoch 826 in which a tenth satellite 130i is visible to the ground station, an eleventh satellite epoch 828 in which an eleventh satellite 130j is visible to the ground station, and a twelfth satellite epoch 830 in which a twelfth satellite 130l is visible to the ground station. In turn, a first satellite epoch 808 follows the twelfth satellite epoch 830, in which the first satellite 130a again becomes visible to the ground station, thus representing a complete cycle through each of the plurality of satellites 130 passing along the sky track 800. As can be appreciated, the pass elevation 802, pass azimuth 804, and pass range 806 follow a repetitive cycle for each successive satellite epoch, indicating the repeating sky track 800, which remains constant.

As can be appreciated, each of the repeating sky track 600, repeating sky track 700, and repeating sky track 800 have different azimuth angles for each satellite epoch of a respective path. In turn, a ground station may have a corresponding set of antennas dedicated to each unique sky track available to the ground station. Also, the satellite epochs for each respective repeating sky track are offset or out of phase. Thus, different ones of the plurality of satellites 130 are present in each individual sky track in any given epoch of the satellite communications system 100.

Figure 11:
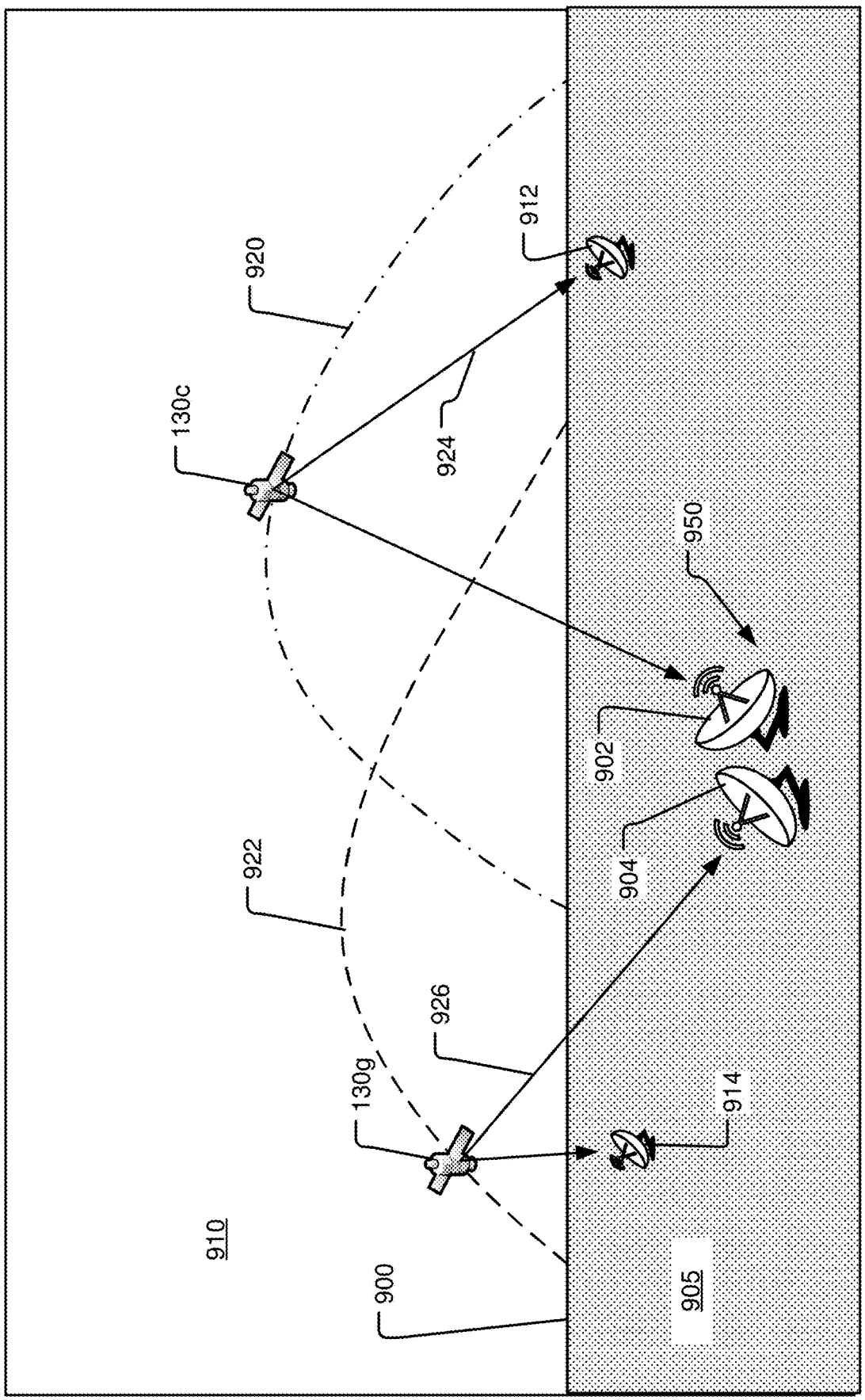
FIG. 11 depicts a simplified view from a ground station using two distinct sky tracks to communicate with user terminals.

With further reference to FIG. 11, the utility of multiple sky tracks available to a gateway 950 is demonstrated. FIG. 11 generally depicts a horizon 900 separating the Earth 905 from the sky 910, as seen from the gateway 950. Also in FIG. 9, the gateway 950 includes at least a first ground station antenna 902 and a second ground station antenna 904. As may be appreciated from the foregoing description, the gateway 950 may also include additional antennas (e.g., to provide successive tracking of satellites in a sky track). In any regard, the first ground station antenna 902 may be in operative communication with a satellite 130c in a first repeating sky track 920 that may be in further communication with a first user terminal 912. Also, a second ground station antenna 904 may be in operative communication with a satellite 130g in a second repeating sky track 922 that may be in further communication with a second user terminal 914.

In this regard, the first user terminal 912 may be capable of tracking satellites in the first repeating sky track 920 (e.g., with multiple antennae at the first user terminal 912 or a phased array antenna tuned to track the first repeating sky track 920 as described in greater detail below) to exchange a communication 924 with the gateway 950 via satellites in the first repeating sky track 920. The second user terminal 914 may be capable of tracking satellites in the second repeating sky track 922 to exchange a communication 926 with the gateway 950 via satellites in the second repeating sky track 922. That is, distinct communication channels may be established by the gateway 950 with different respective sets of user terminals. For example, a first set of user terminals may be tasked with tracking satellites in the first repeating sky track 920, and a second set of user terminals may be tasked with tracking satellites in the second repeating sky track 922. This may provide discrete communication modalities to different sets of user terminals and/or may provide additional bandwidth to the satellite communications system 100. Moreover, while the first user terminal 912 and the second user terminal 914 are shown within the extent of visibility of the single gateway 950 in FIG. 9, it may be that the first user terminal 912 and/or second user terminal 914 are beyond the extent of visibility to the single gateway 950 such that communication between the first user terminal 912 and the single gateway 950 and/or the second user terminal 914 and the single gateway 950 requires relay of the communication 924 or communication 926 using a satellite.

Figure 12:
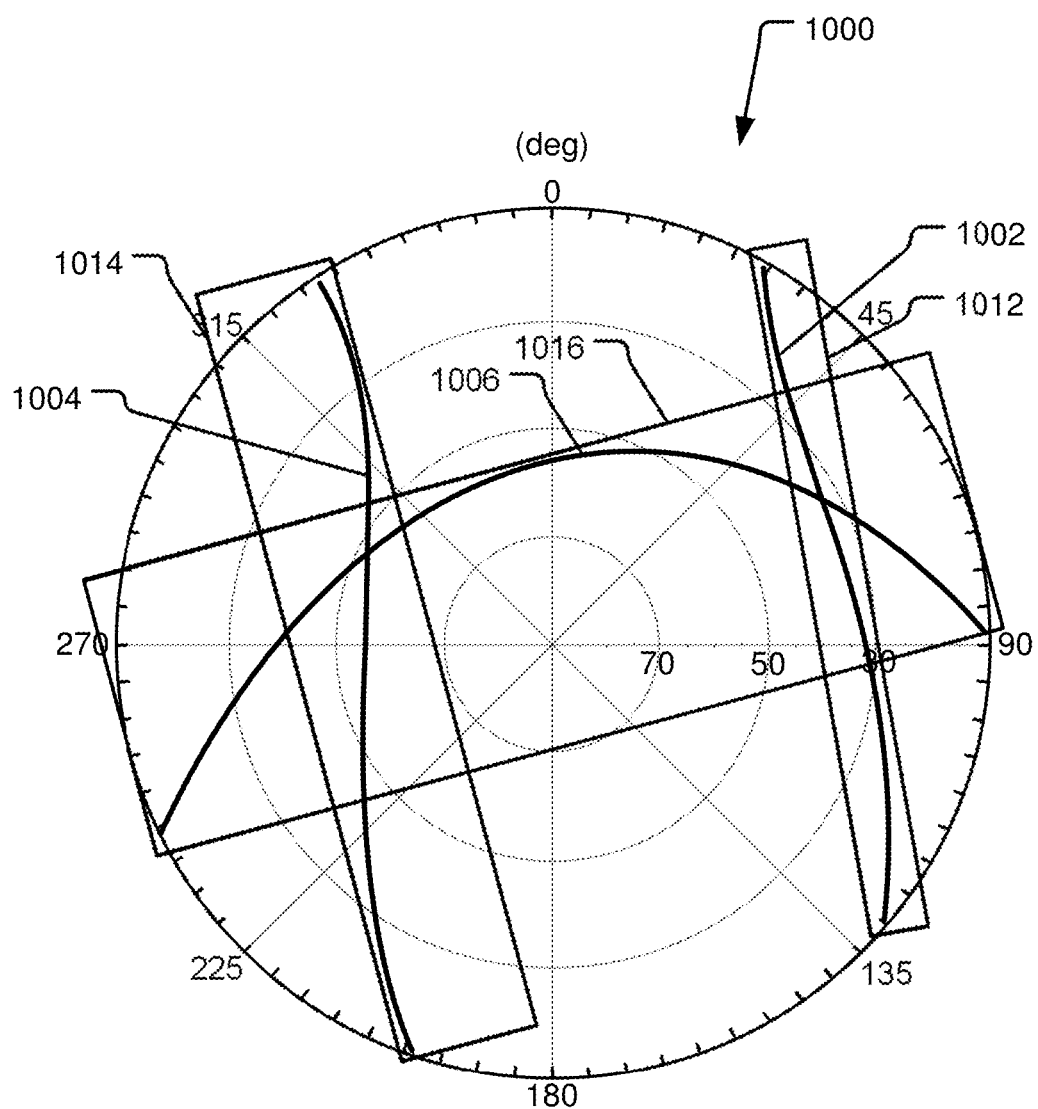
FIG. 12 depicts a polar plot showing the sky tracks of each of the first, second, and third extends of visibility of an orbit relative to a ground station.

FIG. 12 illustrates a polar plot 1000 representing the visible sky relative to a ground station. The ground station could be a gateway or a user terminal. In any regard, the polar plot includes an azimuth angle represented in the angular coordinate of the plot 1000 and an elevation angle in the radial coordinate of the plot 1000. In this regard, a first sky track 1002, a second sky track 1004, and a third sky track 1006 may each extend in the sky relative to the ground station. The plot 1000 also includes a first tracking region 1012 for the first sky track 1002, a second tracking region 1014 for the second sky track 1004, and a third tracking region 1016 for the third sky track 1006. Each tracking region may define a range of azimuth and elevation angles that an antenna at the ground station is capable of communicating to achieve communication with satellites in each respective sky track.

In the context of the ground station being a gateway, the gateway may be in simultaneous communication with respective satellites in each of the first sky track 1002, the second sky track 1004, and the third sky track 1006. Thus, the gateway may include one or more antennas capable of communication in the first tracking region 1012, the second tracking region 1014, and the third tracking region 1016. The gateway may include one or more antennas for simultaneous communication in each of the tracking regions. Antennas may include mechanical and/or electrical tracking elements to allow for communication with each of the respective tracking regions.

In the context of the ground station being a user terminal, it may not be that the user terminal is in communication with a satellite in more than one of the sky tracks. Moreover, as the antenna complexity of a user terminal is advantageously minimized, it may be that the user terminal may be assigned a given sky track to facilitate communication therewith. As can be appreciated, each tracking region for the sky tracks has a different area. The larger the area of the tracking region, the more complex an antenna may be to facilitate communication with the sky track. In this regard, for the example shown in FIG. 12, the first tracking region 1012 may have the smallest area of each of the tracking regions for the user terminal. As such, the user terminal may be assigned to track satellites in the first sky track 1002 associated with the first tracking region 1012. Thus, the antenna design (e.g., including mechanical and/or electrical tracking means such as a phased array antenna) may be simplified. In this regard, the first sky track 1002 may have a more limited extent of azimuth and elevation deviation than the second sky track 1004 and the third sky track 1006, providing more efficient tracking of satellites in the first sky track 1002.

Figure 13:
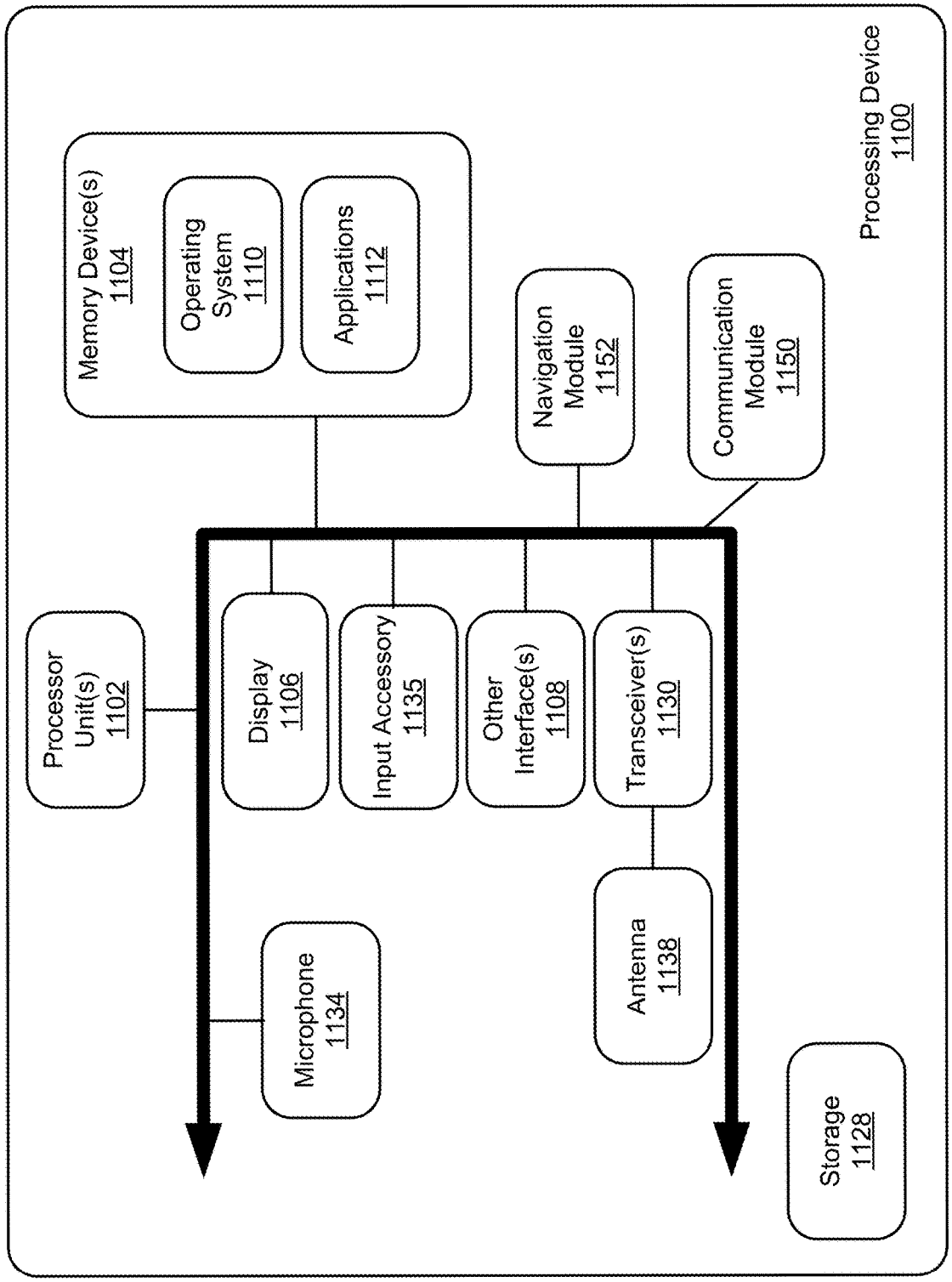
FIG. 13 depicts a schematic view of a computing system that may be used to execute certain features of the present disclosure.

FIG. 13 illustrates an example schematic of a processing system 1100 suitable for implementing aspects of the disclosed technology, including a communication module 1150 and/or navigation module 1152, as described above in relation to the satellite communications system 100. Furthermore, other aspects of the satellite communications system 100 may be controlled by a processing system 1100. The processing system 1100 may include one or more processor unit(s) 1102, memory 1104, a display 1106, and other interfaces 1108 (e.g., buttons). The memory 1104 generally includes both volatile memory (e.g., RAM) and non-volatile memory (e.g., flash memory). An operating system 1110, such as the Microsoft Windows® operating system, the Apple macOS operating system, or the Linux operating system, resides in the memory 1104 and is executed by the processor unit(s) 1102, although it should be understood that other operating systems may be employed.

One or more applications 1112 are loaded in the memory 1104 and executed on the operating system 1110 by the processor unit(s) 1102. Applications 1112 may receive input from various input local devices such as a microphone 1134, input accessory 1135 (e.g., keypad, mouse, stylus, touchpad, joystick, instrument mounted input, or the like). Additionally, the applications 1112 may receive input from one or more remote devices such as remotely-located smart devices by communicating with such devices over a wired or wireless network using more communication transceivers 1130 and an antenna 1138 to provide network connectivity (e.g., a mobile phone network, Wi-Fi®, Bluetooth®). The processing device 1100 may also include various other components, such as a positioning system (e.g., a global positioning satellite transceiver), one or more accelerometers, one or more cameras, an audio interface (e.g., the microphone 1134, an audio amplifier and speaker and/or audio jack), and storage devices 1128. Other configurations may also be employed.

The processing system 1100 further includes a power supply 1116, which is powered by one or more batteries or other power sources and which provides power to other components of the processing system 1100. The power supply 1116 may also be connected to an external power source (not shown) that overrides or recharges the built-in batteries or other power sources.

The processing system 1100 may include a variety of tangible processor-readable storage media and intangible processor-readable communication signals. Tangible processor-readable storage can be embodied by any available media that can be accessed by the processing system 1100 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 1100. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order unless explicitly claimed otherwise or a specific order is inherently necessitated by the claim language.

What is claimed is:

1. A satellite communications system, comprising:
  a plurality of satellites each traveling about the Earth in an orbit such that all of the plurality of satellites has an orbital period that is an integer factor of a sidereal day and all of the plurality of satellites follows a single repeating ground track relative to the surface of the Earth;

each of the plurality of satellites including communication equipment operable to communicate with at least one ground station and a plurality of user terminals to provide communication service to the plurality of user terminals; and the orbit being oriented relative to the Earth to provide continuous satellite visibility between at least one of the plurality of satellites and a ground station in at least one targeted geographic region of the Earth on at least one repeating sky track relative to the at least one ground station, wherein the orbit for each of the plurality of satellites is oriented relative to the Earth to provide continuous satellite visibility to a ground station in a targeted geographic region of the Earth on a first repeating sky track and a second repeating sky track relative to the ground station, wherein the first repeating sky track is different than the second repeating sky track and comprise a different visible satellite in each respective one of the first sky track and the second sky track in any given time;

wherein the orbit is an elliptical orbit having an eccentricity of about 0.26, a semimajor axis of 10,500 km, an apogee of 15,000 km above sea level, and a perigee of 6,000 km above sea level, and wherein the perigee occurs relative to the southern hemisphere of the Earth.

2. The system of claim 1, wherein the orbit is inclined relative to the Earth at a critical inclination angle.

3. The system of claim 1, wherein the orbit comprises an orbital period of 6 sidereal hours.

4. The system of claim 1, wherein the plurality of satellites comprises at least 12 satellites.

5. A satellite communications system, comprising:
a plurality of satellites each traveling about the Earth in an orbit such that all of the plurality of satellites has an orbital period that is an integer factor of a sidereal day and all of the plurality of satellites follows a single repeating ground track relative to the surface of the Earth;

each of the plurality of satellites including communication equipment operable to communicate with at least one ground station and a plurality of user terminals to provide communication service to the plurality of user terminals; and the orbit being oriented relative to the Earth to provide continuous satellite visibility between at least one of the plurality of satellites and a ground station in at least one targeted geographic region of the Earth on at least one repeating sky track relative to the at least one ground station, wherein the orbit for each of the plurality of satellites is oriented relative to the Earth to provide continuous satellite visibility to a ground station in a targeted geographic region of the Earth on a first repeating sky track and a second repeating sky track relative to the ground station, wherein the first repeating sky track is different than the second repeating sky track and comprise a different visible satellite in each respective one of the first sky track and the second sky track in any given time;

wherein the orbit is an elliptical orbit having an eccentricity of about 0.26, and wherein the orbit for each of the plurality of satellites has at least an orbital period, eccentricity, semimajor axis, inclination, and longitude of ascending node, and argument of perigee, and are offset in relation to a satellite epoch for each of the plurality of satellites, and wherein the plurality of satellites are evenly spaced along the single repeating ground track.

6. The system of claim 1, wherein the ground station has a first antenna pair dedicated to the first repeating sky track and a second antenna pair dedicated to the second repeating sky track, each respective antenna pair alternatively tracks successively visible satellites along a corresponding sky track for communication between the ground station and respective ones of the plurality of satellites.

7. The system of claim 6, further comprising:
a first user terminal comprising communication equipment for communication with each respective one of the plurality of satellites and operative to continuously receive communications from the ground station that are relayed from respective ones of the plurality of satellites in the first repeating sky track; and a second user terminal comprising communication equipment for communication with each respective one of the plurality of satellites and operative to continuously receive communications from the ground station that are relayed from respective ones of the plurality of satellites in the second repeating sky track;

wherein each user terminal comprises a user terminal phased array antenna with a communication range that extends to an entirety of at least one sky track for receipt of communication from the ground station relayed by respective ones of the plurality of satellites.

8. A method for control of a satellite communications system, comprising:
operating a plurality of satellites each traveling about the Earth in an orbit such that the plurality of satellites have an orbital period that is an integer factor of a sidereal day and all of the plurality of satellites follows a single repeating ground track relative to the surface of the Earth;

equipping each satellite of the plurality of satellites with communication equipment operable to communicate with at least one ground station and a plurality of user terminals to provide data communication service to the plurality of user terminals; and orienting the orbit of each of the plurality of satellites relative to the Earth to provide continuous satellite visibility to a ground station in a targeted geographic region of the Earth on a first repeating sky track and a second repeating sky track relative to the ground station, wherein the first repeating sky track is different than the second repeating sky track and comprise a different visible satellites in each respective one of the first sky track and the second sky track in any given time;

wherein the orbit is an elliptical orbit having an eccentricity of about 0.26, a semimajor axis of 10,500 km, an apogee of 15,000 km above sea level, and a perigee of 6,000 km above sea level, and the perigee occurs relative to the southern hemisphere of the Earth.

9. The method of claim 8, wherein the orbit is inclined relative to the Earth at a critical inclination angle.

10. The method of claim 8, wherein the orbit comprises an orbital period of 6 sidereal hours.

11. The method of claim 8, wherein the plurality of satellites comprises at least 12 satellites.

12. The method of claim 8, further comprising:
tracking satellites of the plurality of satellites at the ground station using a first antenna pair dedicated to the first repeating sky track;

tracking satellites of the plurality of satellites at the ground station using a second antenna pair dedicated to the second repeating sky track; and wherein each respective antenna pair alternatively tracks successively visible satellites along a corresponding sky track for communication between the ground station and respective ones of the plurality of satellites.

13. The method of claim 12, further comprising:

communicating with communication equipment of a first user terminal with each successive one of the plurality of satellites in the first repeating sky track to continuously receive communications at the first user terminal from the ground station that are relayed from respective ones of the plurality of satellites in the first repeating sky track;

communicating with communication equipment of a second user terminal with each successive one of the plurality of satellites in the second repeating sky track to continuously receive communications at the second user terminal from the ground station that are relayed from respective ones of the plurality of satellites in the second repeating sky track; and targeting a reception and a transmission pattern of a phased array antenna at each of the first user terminal and the second user terminal along at least one of the first repeating sky track or the second repeating sky track.

14. A method for control of a satellite communications system, comprising:

operating a plurality of satellites each traveling about the Earth in an orbit such that the plurality of satellites have an orbital period that is an integer factor of a sidereal day and all of the plurality of satellites follows a single repeating ground track relative to the surface of the Earth;

equipping each satellite of the plurality of satellites with communication equipment operable to communicate with at least one ground station and a plurality of user terminals to provide data communication service to the plurality of user terminals; and orienting the orbit of each of the plurality of satellites relative to the Earth to provide continuous satellite visibility to a ground station in a targeted geographic region of the Earth on a first repeating sky track and a second repeating sky track relative to the ground station, wherein the first repeating sky track is different than the second repeating sky track and comprise a different visible satellites in each respective one of the first sky track and the second sky track in any given time;

wherein the orbit for each of the plurality of satellites has at least an orbital period, eccentricity, semimajor axis, inclination, longitude of ascending node, and argument of perigee, and are offset in relation to a satellite epoch for each of the plurality of satellites, and wherein the plurality of satellites are evenly spaced along the single repeating ground track.

* * * * *